US011531993B2

(12) United States Patent
Teo et al.

(10) Patent No.: US 11,531,993 B2
(45) Date of Patent: Dec. 20, 2022

(54) MACHINE LEARNING-DRIVEN SERVICING INTERFACE

(71) Applicant: Capital One Services, LLC, McLean, VA (US)

(72) Inventors: Koon Heng Ivan Teo, McLean, VA (US); Volodymyr Orlov, McLean, VA (US); Yazdan Shirvany, McLean, VA (US); Fernando San Martin Jorquera, McLean, VA (US); Francisco Perez Leon, McLean, VA (US); Yoonseong Kim, McLean, VA (US); Mohammad Shami, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 843 days.

(21) Appl. No.: 16/253,065

(22) Filed: Jan. 21, 2019

(65) Prior Publication Data

US 2020/0097981 A1   Mar. 26, 2020

Related U.S. Application Data (62) Division of application No. 16/141,521, filed on Sep. 25, 2018.

(51) Int. Cl.
*G06Q 30/00* (2012.01)
*H04L 67/306* (2022.01)
(Continued)

(52) U.S. Cl.
CPC ........... *G06Q 30/016* (2013.01); *G06N 20/00* (2019.01); *G06Q 30/0281* (2013.01); *H04L 67/306* (2013.01); *H04M 3/5183* (2013.01)

(58) Field of Classification Search
CPC .............. G06Q 30/016; G06Q 30/0281; H04L 67/306; H04L 67/22; H04M 3/5183;
(Continued)

(56) References Cited

U.S. PATENT DOCUMENTS 8,606,725 B1   12/2013   Agichtein et al.
9,088,533 B1 *  7/2015   Zeng ..................... G06N 3/084
(Continued)

FOREIGN PATENT DOCUMENTS

CN   100573694 C     12/2009
CN   103942232 A *   7/2014   ......... G06F 16/9535
(Continued)

OTHER PUBLICATIONS

Jason R. Fitzsimmons, "Interaction Between Feasibility and Desirability in the Formation of Entrepreneurial Intentions", Jul. 2011, Journal of Business Venturing, vol. 26, Issue 4, pp. 431-440. (Year: 2011).*

(Continued)

*Primary Examiner* — Tan D Nguyen
(74) *Attorney, Agent, or Firm* — KDB (57) ABSTRACT

Systems and methods for customizing business applications based upon user intent scores is described. A machine learning model trained to specifically predict when a user is likely to engage in a specific activity while interacting with the business application may be trained using data regarding prior interactions between a business application and a plurality of users. The machine learning model may thereafter provide a probability score for a particular user, the probability score indicating the likelihood that the user will engage in the specific activity for which the model has been trained to predict. The probability may be combined with a business value factor to produce a user intent score indicating the relative value of the user engaging in the specific (Continued)

activity. A business application comprising an app executing on a client device, a webpage, an automated menu at a call-in service center, or human operator interacting with the user at a call in the service center may be customized for the particular user based upon the user intent scores.

16 Claims, 7 Drawing Sheets

(51) Int. Cl.
*H04M 3/51* (2006.01)
*G06Q 30/02* (2012.01)
*G06N 20/00* (2019.01)

(58) Field of Classification Search
CPC ....... H04M 3/42144; H04M 2203/256; H04M 3/5166; G06N 20/00
USPC ........................................................ 705/304
See application file for complete search history.

(56) References Cited

U.S. PATENT DOCUMENTS

| | | | |
|---|---|---|---|
| 2003/0117445 | A1 | 6/2003 | Hendricks et al. |
| 2004/0158494 | A1 | 8/2004 | Suthar |
| 2011/0131160 | A1 | 6/2011 | Canny et al. |
| 2014/0143157 | A1 | 5/2014 | Jeffs et al. |
| 2015/0348128 | A1* | 12/2015 | Zeng ................. H04L 51/04 706/12 |
| 2016/0055160 | A1* | 2/2016 | Himel ................ G06F 16/248 707/728 |
| 2016/0287544 | A1 | 10/2016 | Pianowski et al. |
| 2016/0307233 | A1 | 10/2016 | Pan et al. |
| 2016/0350870 | A1 | 12/2016 | Morin et al. |
| 2017/0032275 | A1 | 2/2017 | Lytkin et al. |
| 2017/0111509 | A1 | 4/2017 | McGann et al. |
| 2017/0257337 | A1 | 9/2017 | Hampson et al. |
| 2017/0286423 | A1* | 10/2017 | Shorman ............ G06F 16/9535 |
| 2017/0345035 | A1 | 11/2017 | Zeng et al. |
| 2018/0032890 | A1 | 2/2018 | Podgorny et al. |
| 2018/0064402 | A1 | 3/2018 | Leydon |

FOREIGN PATENT DOCUMENTS

| | | | | |
|---|---|---|---|---|
| CN | 105468887 | A * | 4/2016 | |
| CN | 107480161 | A | 12/2017 | |
| CN | 109299961 | A | 2/2019 | |
| JP | 2016218869 | A * | 12/2016 | |
| WO | WO-2007048008 | A2 * | 4/2007 | ............. G06Q 10/04 |
| WO | 2007124116 | A2 | 11/2007 | |
| WO | 2010147453 | A1 | 12/2010 | |
| WO | WO-2013066746 | A1 * | 5/2013 | ......... E21B 41/0092 |
| WO | 2017159614 | A1 | 9/2017 | |

OTHER PUBLICATIONS

L. Yan, "Customer Behavior Prediction—It's all in the timing", Jan. 10, 2004, IEEE Potentials (vol. 23, Issue 4, pp. 20-25, abstract only. (Year: 2004).*
Jing Li, "Neural Attentive Session-Based Recommendation", Nov. 6-10, 2017, CIKM'17, pp. 1419-1428. (Year: 2017).*
Arnold Kamis, "A flow-based model of web site intentions when users customize products in business-to-consumer electronic commerce," Aug. 2008, Information System Front (2010), 12:157-168 (Year: 2008).*
Ozertem, "Learning to Suggest: A Machine Learning Framework for Ranking Query Suggestions", Aug. 12-16, 2012, SIGIR '12, pp. 25-34. (Year: 2012).
Hu, "Understanding User's Query Intent with Wikipedia", Proceedings of the 18th Conference, WWW 2009 Madrid, pp. 471-480. (Year: 2009).
IQ.IP.COM/discover for U.S. Appl. No. 16/141,521 Search copy. (Year: 2021).
Borgli, "Saga: An Open Source Platform for Training ML Models and Community Driven Sharing Techniques", Sep. 1, 2019, International Conference on Content-Based Multimedia Indexing (CMBI), pp. 1-4, Abstract. (Year: 2019).
Gamecho, "Automatic Generation of Tailored Accessible User Interfaces for Ubiquitous Services", Oct. 2, 2015, IEEE Transactions on Human-Machine Systems, vol. 45, Issue: 5, pp. 612-623, Abstract. (Year: 2015).
Viennot "A Measurement Study of Google Play", 2014, Sigmetrics' 14, Jun. 16-20, 2014, pp. 1-13.

* cited by examiner

```
┌─────────────────────────────────────────────┐
│ Retrieve relevant dataframes from data warehouse │
│                      602                     │
└─────────────────────────────────────────────┘
                      │
┌─────────────────────────────────────────────┐
│ Choose data features for all users from retrieved dataframes appropriate for │
│ scoring of specific user intent to create a processed dataframe specific │
│                      604                     │
└─────────────────────────────────────────────┘
                      │
┌─────────────────────────────────────────────┐
│     Apply model to processed dataframe for all users     │
│                      606                     │
└─────────────────────────────────────────────┘
                      │
┌─────────────────────────────────────────────┐
│ Combine scores with business value factors and organic relevance factors │
│                      608                     │
└─────────────────────────────────────────────┘
                      │
┌─────────────────────────────────────────────┐
│  Store scores for all users for specific user intent to  │
│           User Intent Scores Database           │
│                      610                     │
└─────────────────────────────────────────────┘
```

Receive request from business application for user intent scores for a specific user, including data from user's current session
*702*

Retrieve relevant dataframes from data warehouse pertaining to the specific user in the request
*704*

Choose data features for specific user from retrieved dataframes appropriate for scoring of specific user intents to create a processed static dataframe
*706*

Apply models to processed static dataframe and real-time streaming events for the specific user
*708*

Combine scores with business value factors and organic relevance factors
*710*

Store user intent scores for specific user in User Scores Database
*712*

Reply to request from business application with a ranked list of user intent scores or list of user intents having the highest scores.
*714*

*FIG. 7* ns interface
MACHINE LEARNING-DRIVEN SERVICING INTERFACE

CROSS-REFERENCE TO RELATED APPLICATIONS

This application is a Divisional of U.S. application Ser. No. 16/141,521, filed on Sep. 25, 2018, the disclosure of which is incorporated herein by reference in its entirety.

BACKGROUND

Providers of goods and services interact with their customers in a variety of ways. In particular, service providers, for example, financial institutions, such as banks and credit unions, traditionally interacted with customers by having the customers visit a physical location. With the advent of the Internet, newer, more efficient, methods of interacting with customers have been developed. For example, customers may access products and services of the service provider by accessing a webpage hosted by the provider. In a similar manner, many service providers offer a customized application which may be downloaded to a tablet computing device or smartphone and which may provide access to products and services specifically for the service provider. Customers may also be contacted by having the service provider contact the customer directly using unsolicited emails. Lastly, most service providers provide a call-in number where a customer may interact with an automated menu or a service representative of the service provider to get information about products and services and to solve problems encountered by the customer.

Such methods of contact between customers and service providers may be inefficient. A customer using a service provider-specific app or accessing a service provider website may be presented with a wide variety of activities, for example, viewing account information, applying for loans, making payments, editing user profile information, etc. Navigating the app or website may be difficult for the customer, especially if the customer has a specific task in mind. Thus, the experience may be frustrating for the customer. Additionally, customers contacting a call-in service interface may be faced with interacting with an automated menu, which a customer may also find frustrating. Lastly, if the customer interacts with an actual service representative of the service provider, cost is incurred by the service provider. Therefore, it would be desirable to be able to provide a more customized experience for the customer and a more economical experience for the service provider by customizing the experience based on knowledge of the previous history of the individual customers.

DETAILED DESCRIPTION

Various embodiments are directed to techniques for customizing a business application for individual customers utilizing machine learning-trained models. The models may be directed to determine specific user intents as the user interacts with business applications of the service provider, the user intents being specific activities that the user is likely to engage in when interacting with the business application.

As used herein, the terms "user" and "customer" are used interchangeably.

As used herein, the term "business application" means any method of interaction between the user and the service provider which may be used by the user to access various products and services of the service provider. In the case of a financial institution, the products and services may include, for example, accessing account information, opening new accounts, making payments, requesting information regarding new products and services, applying for new products or services, for example, a credit card or loan, reporting fraudulent account activity, and reporting lost or stolen credit cards. This list is, of course, not inclusive. Many other products and services may also be available. Additionally, the business application may be used to solicit users to use new products and services, or products and services which the user is not currently already using.

As used herein, the term "dataframe" means information on a collection of entities (e.g., customers of a financial institution), such that the information pertaining to each entity conforms to a set of properties relating to the entity, including an identifying label for the entity.

In one embodiment, a business application could be, for example, a customized mobile application specific to the service provider which is downloaded to a user's smart phone or tablet computing device and which, when executed on the device, will connect with a server of the service provider via a cellular or Wi-Fi connection. Data regarding opportunities for accessing products and services of the service provider may be downloaded and are presented to the user. The user may be provided with a user interface on the display of the smart phone or tablet computing device which allows a user to access the various products and services through the selection of user-activated controls on the display. In another embodiment, a business application could be a website served by a server of the service provider and accessed by the user using a standard web browser available on any type of computing device.

In another embodiment, the business application could be an automated menu accessed by the user by calling into the service provider's service center. In yet another embodiment, the business application could comprise wherein the user calls into a service center of the service provider and connects with a human service representative. In this case, the human service representative, accessing an operator's console, acts as the business application. Other embodiments comprising other business applications are contemplated to be within the scope of the invention.

The machine learning models utilized in embodiments are directed to determining user intents as the user interacts with the business application. Machine learning models for each specific user intent provide a probability that a user will engage in a specific activity while interacting with a business application. The user intents may be divided into four broad categories.

Cross-sell propensity models predict the likelihood of a user acquiring a specific product or service that is not already owned. For example, in the case of financial institution, a model may determine if a specific customer is likely to accept an offer of a new credit card having various features. In this case, a separate model would exist for each specific product. The cross-sell propensity models have applicability to all types of business applications. In the mobile app or website business applications, a user could be provided with a pop-up or sidebar solicitation advertising the features of the new product or service. In the case where the user calls in to an automated menu, the menu could query the user to determine if the user would listen to an audio pitch for the new product or could provide the audio pitch unsolicited to the user. In the case where the user calls in and speaks to a human service representative, the human service representative could be prompted, via the operator console, to attempt to cross-sell the user regarding the new product or service.

Feature recommendation models are applicable to mobile apps and websites and predict the feature of the mobile app or website that the user is most likely to use next. For example, a model could be used to determine the likelihood that the user wishes to access a feature showing rewards available to the user for performing various activities, for example, cash back rewards for use of a credit card. The business application may use this information to provide easy access to these features of the mobile app or website.

A user intent prediction model is also applicable to mobile apps or websites and predicts a task that a user is likely to initiate while interacting with the mobile app or website. For example, a model could be used to determine the likelihood that a user will want to download an account statement, redeem rewards, go paperless, etc. The business application could use this information to provide an easy way for the user to initiate the task by providing a prominent button on the screen of the mobile app or in in a prominent place on a page of the website being accessed by the user.

A call reason prediction model is applicable to business applications wherein the user calls in to access an automated menu or to speak to a human service representative at a call-in service center. Call reason prediction models determine the likelihood that a user will request various information or services. For example, a model could determine that a user is likely calling in to report a lost or stolen credit card. In such a case, the automated menu could be reprogrammed to provide that option at or near the beginning of the interaction with user. In the case of a user speaking to a human service representative, the human representative could ask after the initiation of the phone call if the user wishes to report a lost or stolen credit card.

The user intent machine learning models are provided as a service to the business applications. A business application may request a user intent score for each user intent or ask for a list of user intents ranked by their respective user intent scores. A unique identifier for the user provided by the business application may specify to the model which user the business application is querying about.

In one embodiment, a mobile app or a website may allow a user to logon for access to personal information, for example account information, by providing login credentials. The login credentials may be used as a parameter to submit a request to a server for user intent scores applicable to the specific user. Once user intent scores for the specific user are received, the mobile app or website may customize the interface for the specific user. For example, the mobile app or website may customize the interface to show advertisements for specific products or services to which the user is likely to be receptive or may customize the website to provide easy access to features that the user is likely to access or to tasks that the user is likely to initiate.

In another embodiment, in the case where the user calls in to access an automated menu, the software providing the automated menu functionality, after verifying the identity of the user, may submit a request to the server for user intent scores applicable to the specific user. The automated menu may then utilize the scores to provide customize audible menus for the user by providing certain options in the first layer of menus or otherwise making it easy for the user access certain features.

In yet another embodiment, in the case where the user calls to speak to a human service representative, the software at the representative's operator console may take as input an identifier identifying the user and may make a request to a server for user intent scores. The user intent scores, when viewed by the representative, may be used to steer the conversation with user to suggest certain cross-sell opportunities or to ask if the user wishes to engage in certain tasks.

This customization provides an improved end user experience for the user in that the user is likely to be provided with the desired experience in a manner that the user finds less frustrating than interacting with generic business applications. In addition, the service provider may realize a cost savings through increased efficiency. For example, if the user is satisfied by having received the desired services through a mobile app or website, the user may be less likely to call in to a call center, thereby resulting in a cost savings for the service provider.

Various embodiments contemplate a user intent server serving the business applications as clients. The user intent server fields requests from business applications, as discussed previously, for user intent scores. The request may be in the form of a call to an application programming interface (API) provided by the user intents server or by any other means well known in the art for a client to request the service from a server over a network. The request may include for example requests for specific user intent scores or may be a general request which the user intents server response to by providing the highest user intent scores.

User intent scores represent a business value, which may be expressed as a dollar value, of the user intent to the service provider. In other words, the user intent score quantifies a value to the service provider of the user engaging in a specific activity or user intent. The value of the user intent may be realized, for example, by the ability to sell a new product or service to the user or through the ability to deter the user from calling the service center of the service provider by satisfying the user through other means. The user intent score is thus a combination of a business value of the user intent and a probability that a user will engage in the user intent, as predicted by the machine learning-trained models for each user intent. In the simplest embodiment, the combination is a product of the user intent score and the business value, although other methods of combination may be used. As such, a user intent having a high business value but a low probability that the user will engage in the specific activity may have a user intent score similar to another user intent having a low business value but a very high probability of occurring. A business application may decide how to interpret the user intent scores. Different business application may interpret the scores differently and may take different actions upon receiving the user intent scores. Other factors, including organic relevance factors, may also be factored into the calculation of the user intent scores. The business value may be obtained from existing data on previous user engagements.

Organic relevance factors represent factors beyond simple dollar amounts which may influence the business value factor. As an example, a campaign to sign up customers for a particular product could have a quota requirement for the purpose of collecting enough data to build a model or to guarantee volume for a follow-up campaign. In this case, the business may prioritize this particular product by adding a fixed increment to scores for this product. In another example, a change in the accounting methodology for rewards redeemed could make the rewards redemption feature on the mobile app feature more important. Without prior data on the business value of a customer redeeming rewards under the new accounting scheme, the business will have to add an estimated increment to the previous business value in order give the rewards redemption feature greater priority relative to other business intents.

In certain embodiments of the invention, individual machine learning models are trained for specific user intents using input machine learning features. For cross-sell propensity models, the models may be trained utilizing features which include account history-related variables and digital clickstream variables at the customer level. Examples of account history data include types of accounts owned, status of each account, and ages of accounts examples of digital clickstream data include the number of recent logins, time spent browsing the mobile application or website, and types of pages browsed.

Individual machine learning models for feature recommendation and user intent prediction models may be trained utilizing app feature usage variables, for example, amount of rewards recently redeemed, recent payments made, recent account and rewards balances and recent transaction behavior, in addition to account history and digital clickstream data.

Machine learning models for call reason prediction may be trained on transaction data, account-level events, for example fraud and change of address events, digital clickstream data, payment data and call history data such as frequency and recency of calls.

Once a model for a specific user intent has been trained utilizing these features, the models may be queried for a specific user by providing an identifier for the user. The model will then retrieve the same categories of data for the specific user that were used for training the model, to determine the probability that the outcome for which the model has been trained will result for the specific user. The probability produced by the model is then combined with the business value and, optionally, other organic relevance factors for the user intent to produce the user intent score for the specific user.

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments. Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples and background information will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth to provide a thorough understanding of the claimed embodiments. However, the novel embodiments can be practiced without these specific details. In other instances, well-known structures and devices are shown in block diagram form to facilitate a description thereof. The intention is to cover all modifications equivalents and alternatives consistent with the claimed subject matter.

In the figures and the accompanying description, the designation "n" is intended to be a variable representing any positive integer. Thus, for example, if an implementation sets a value for n=5, then a complete set of components 100, illustrated as 100-1 through 100-n may include components 100-1, 100-2, 100-3, 100-4 and 100-5. The embodiments are not limited in this context.

Figure 1:
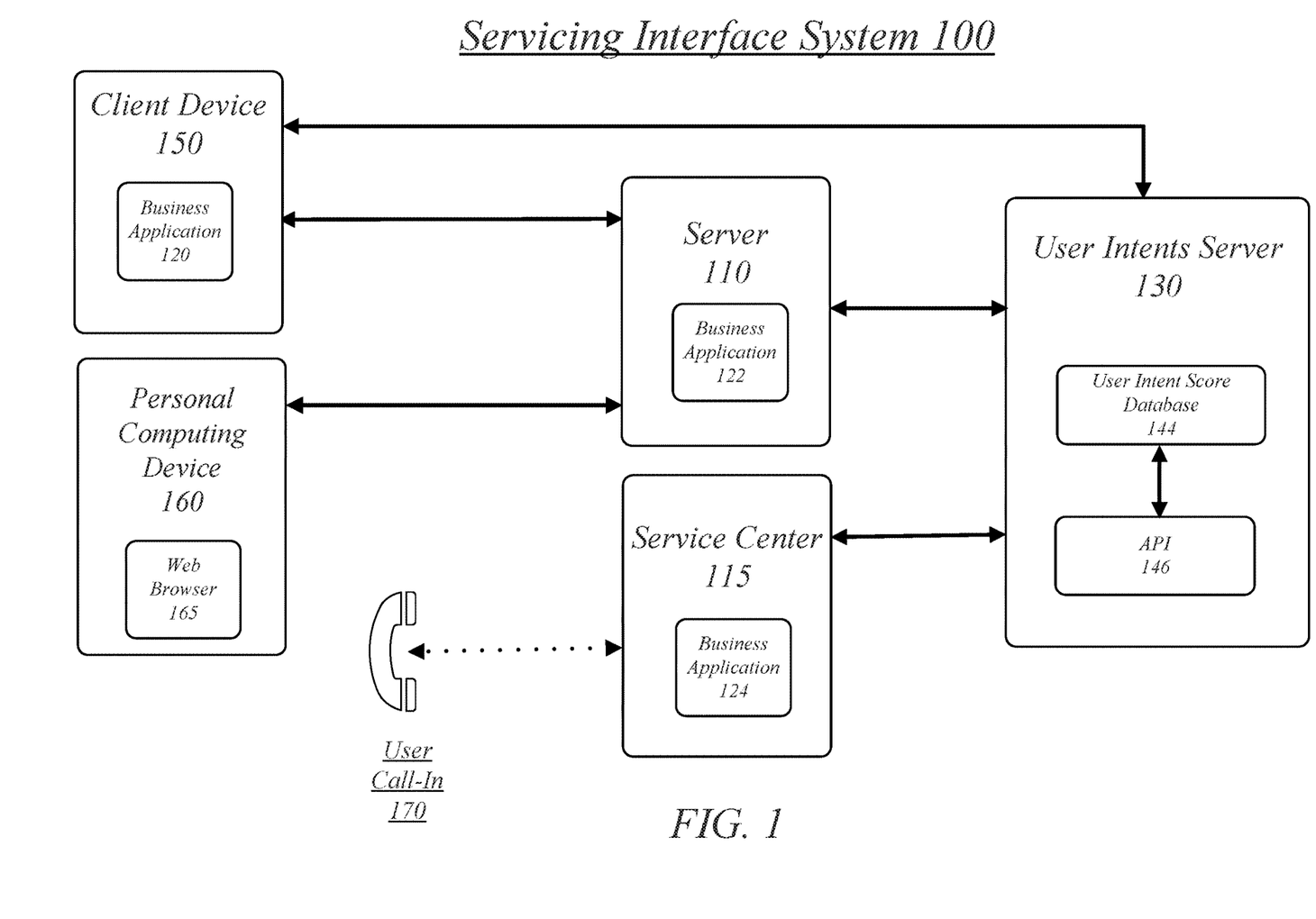
FIG. 1 illustrates an embodiment of a servicing interface system.

FIG. 1 illustrates a block diagram for the servicing interface system 100. Although the system 100 shown in FIG. 1 has a limited number of elements in a certain topology, it may be appreciated that system 100 may include more or less elements in alternate topologies as desired for a given implementation.

A user may interact with the servicing interface system 100 through a variety of means. In one embodiment, a user 100 may utilize a client device 150 running a business application 120 comprising an application which has been customized for a particular service provider, for example, a financial institution. The client device may comprise an iPhone® device, an Android® device, a Blackberry® device, or any other mobile computing device conforming to a smart phone format. Client device 150 may also comprise a smart tablet, such as an iPad® device, a Kindle Fire® device, an Android® tablet device or any other tablet computing device. Client device 150 may be a cellular-enabled device capable of connecting to a cellular network and capable of exchanging data using the cellular data network. Client device 150 may also exchange data over a wide area network or local area network using any one of a number of well-known wireless formats, for example, Wi-Fi or Bluetooth®.

In another embodiment, users may also utilize a personal computing device 160. The personal computing device 160 may comprise a Mac OS® device, a Windows® device, a Linux® device, or any other computing device running any other operating system. Personal computing 160 may be network capable and may connect to a network via any one of a number of well-known means including a hardwired cable, Wi-Fi, Bluetooth, or any other networking technologies for connecting to a network, such as the Internet. Personal computing device 160 may execute a web browser 165, for example, Internet Explorer®, Safari®, Chrome®, Firefox® or any other web browser 165 capable of allowing a user of personal computing device 160 to access webpages.

The service provider may operate a server 110 for servicing a business application 120 operating on client device 150 or for serving a webpage comprising business application 122 executing on server 110. The service provider may additionally operate user intents server 130 for the purpose of calculating and communicating user intent scores. Server devices 110 and 130 may comprise, without limitation, a server, a server array or server farm, a web server, a network server, an Internet server, a workstation, a mini-computer, a main frame computer, a network appliance, a web appliance, multiprocessor systems, processor-based systems, or any combination thereof. Further, server 110 and user intent server 130 could be the same or different devices.

Users utilizing a client device 150 may execute a business application 120 comprising an application customized for access to a particular service provider. Business application 120 may require information specific to the user to provide the user with a meaningful experience while interacting with the business application. For example, in the case of a financial institution, business application 120 may be provided with information pertaining to the user's accounts, and may afford the user the ability to make withdrawals, transfer funds, make payments, etc. Business application 120 may also allow the user to initiate new products or services. In addition, business application 120 may have an area set aside for providing solicitations or advertisements to the user for products or services offered by the finance the institution not currently used by the user. Content specific to the user required by business application 120 may be provided by server 110. Business application 120 may identify the user based on user credential information that may be provided by the user. Such information may be in the form of a username/password combination or may be provided via a biomarker, such as a fingerprint or via facial recognition. Business application 120 may communicate to server 110 utilizing the networking capabilities of client device 150.

In an alternate embodiment, a personal computing device 160 may use to access business application 122 utilizing web browser 165. Business application 122 may be provided in the form of a website specific to the service provider and served by server 110. Business application 122 may provide the same or similar functionality as business application 120 executing on client device 150.

In yet another embodiment, business application 124 may be provided for access to a service center 115 of the service provider. The service center 115 may be a call-in number where users may access services using a call-in device 170, for example a standard telephone, a smart phone, a cellular phone or a Wi-Fi phone. In one embodiment, users may call in to access an automated menu system which may, in turn access business application 124 to provide customized audio menus to the user. In yet other embodiments users may call in for access to a human representative of the service provider who may access business application 124 on behalf of the user. The human representative may access the business application 124 via a locally connected computer or operator's console. Business application 124 may have a different user interface than business application 120 or 122. For example, business application 124 may provide a human representative with prompts to use when speaking with the user.

Server 110 and service center 115 may customize or modify information provided to the user of business applications 120, 122, and 124 based on information received from user intents server 130. Server 110 and service center 115 may provide the identity of the user to user intents server 130 and may receive a plurality of user intent scores which may be used to customize business application 120, 122 and 124. Server 110 and service center 115 may communicate with user intents server 130 via API 146 or through any other means known in the art, for example, using a JavaScript or via sending and receiving HTML-based messages. API 146 may be accessed over a wide area network, a local area network, a hardwired connection or by any other means through which servers may communicate with each other. In addition, in one embodiment, server 110 and/or service center 115 may be integral with user intents server 130 in which case API 146 may be accessed programmatically by business application 122 or 124. In certain embodiments, business application 120 running on client device 150 may access user intents server 130 directly to obtain user intent scores, or may receive user intent scores through server 110. User intent server 130 may retrieve the user intent scores from user intent score database 144, or may generate the user intent scores in real time.

Figure 2:
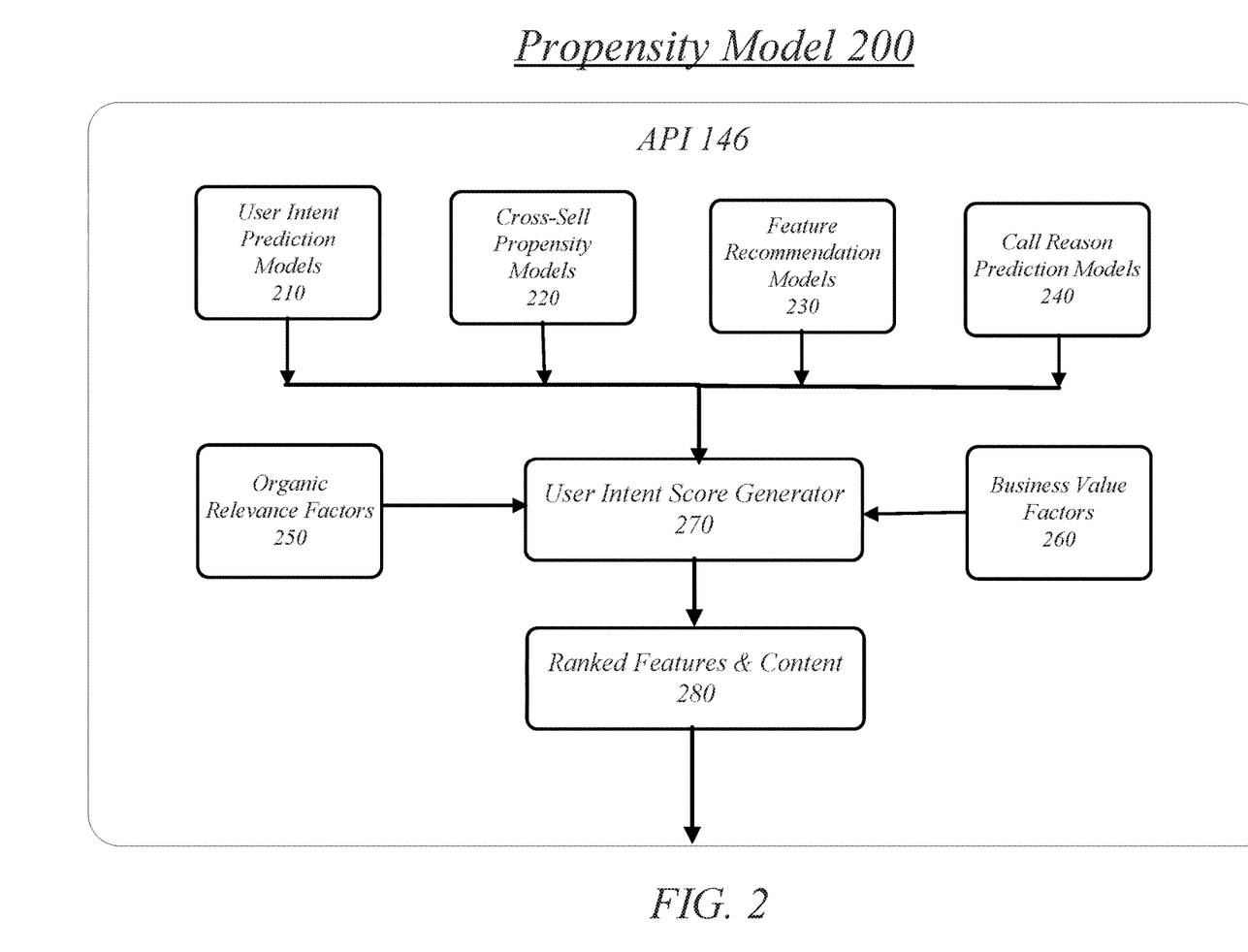
FIG. 2 is a block diagram of a propensity model in accordance with embodiments of the invention discussed herein.

FIG. 2 shows the interaction of propensity models with the user intent score generator to provide the user intent scores which are communicated via API 146. FIG. 2 shows four broad categories of propensity models: user intent prediction models 210, cross sell propensity models 220, feature recommendation models 230, and call reason prediction models 240. It should be realized by one of skill in the art that each broad category of propensity models may have many individual models included therein which have been trained for specific purposes. For example, cross-sell propensity models 220 may include a separate model for each product and service that may be suggested to the user, such as a new credit card product or credit monitoring service, while user intent prediction models may include separate models to determine if the user is likely to access their account, their user profile information, or their user preference settings while interacting with the business application.

Propensity models output a probability, ranging from 0 to 1, that the user will engage in a specific activity predicted by the model. For example, in the case of a cross-sell propensity model to determine if the user may be interested in a new credit card offering, the model will provide a probability that the user is likely to engage in the specific activity of applying for the credit card. If the probability exceeds a particular threshold, business applications 120, 122, 124 may provide a solicitation to the user providing user an opportunity to apply for the credit card. The probability for each model is fed to user intents core generator 270 to calculate the actual user intent scores. Other inputs to the user intent score generator 270 may include business value factors 260 and organic relevance factors 250.

Business value factors 260 provide a measure of value to the service provider of the user engaging in the specific activity predicted by the propensity models. The business value factors 260 may be in the form of a dollar value or maybe some other measure of value. Organic relevance factors 250 may include any other factors which the service provider may consider relevant in determining the user intent score, as previously described.

The user intent score generator 270 generates a user intent score for each model as a combination of the probabilities generated by the individual propensity models, the business value factors and the organic relevance factors, for each user intent, which business applications 120, 122, 124 may use to customize their user interfaces to provide opportunities for the users to engage in specific activities predicted by propensity models. For example, a cross-sell propensity model trained to predict the likelihood that a user would apply for a new credit card product may generate a user intent score that may be interpreted by business applications 120, 122, 124 to determine that an ad should be placed in the user interface of the business application, thereby providing the user the opportunity to apply for the credit card. The overall combination of business value factors 260, organic relevance factors 250 and the probabilities generated by propensity models when combined, provide relative scores for each model. For example, a specific activity for a user having a probability predicted by one of the propensity models may have a very high business value to the service provider but a very low probability of the user engaging in the activity. Likewise, another model may predict a different specific activity for user having a very high probability of the user engaging in the specific activity but a lower business value to the service provider. In such cases, business applications 120, 122, 124 may be programmed to decide which specific activity to prompt the user to engage in, based upon the relative user intent scores.

User intent score generator 270 may be queried by business applications 120, 122, 124 for specific user intent scores, or may provide the business applications a ranked list of user intent scores 280, ordered by the relative value indicated by the user intent scores. Features and content may also be provided to the business application via user intents server 130 or via server 110, for example, graphics to present to the user in the user interface of the business application.

Figure 3:
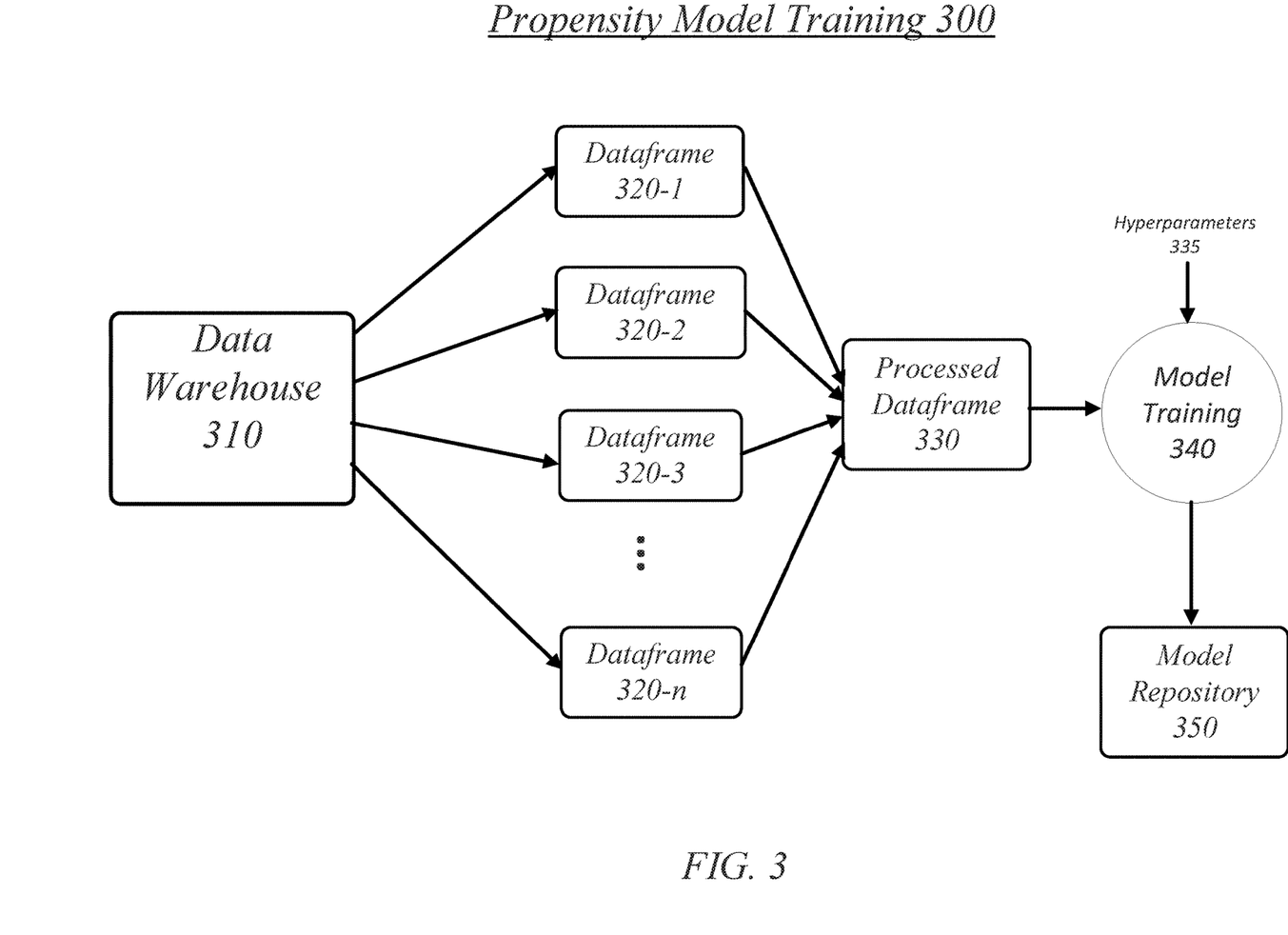
FIG. 3 illustrates an embodiment of the invention wherein user intent models are trained utilizing data stored in a data warehouse.

FIG. 3 is a block diagram showing the process of propensity model training 300. A data warehouse 310 stores information regarding each individual user which can be used as features to train the models. Generally, all models within the same category will share the same features used for training all models within the category, with the difference being a hyperparameter 335 indicating the desired result variable for which each model is being trained. Data in data warehouse 310 may include, for example, account history for each user including types of accounts owned, status of each account and ages of each account, visual clickstream data including the not number of recent logins, the time spent browsing the mobile application or website and the types of pages browsed, application feature usage, such as the amount of rewards redeemed and payments made recently, recent account and rewards balances and recent transaction behavior, transaction data, account-level events, such as fraud and change-of-address, payment data and call history data. The particular data features used to train the propensity models may vary from industry to industry.

Data regarding each user account is stored in the data warehouse 310 within dataframes **320-1, 320-2 . . . 320-*n*. Data warehouse 310 may be accessible via a cloud storage and retrieval model or may be stored locally. Because each model within each category of propensity models may be trained using the same or similar features, these features may be extracted from dataframes 320-1, 320-2 . . . 320-*n* and placed in processed data frame 330. Thus, the process of transforming the individual data frames to a processed data frame 330 need only be performed once for each category of propensity models. Hyperparameters 335 may be used to specify the specific variable for which each model is being trained. Model training 340 uses data within processed data frame 330 to train the model for a specific outcome and places the trained model in model repository 350**. The trained models may be back-tested against historical data that is more recent than the training data, and the performance of each model may be retained for monitoring purposes to evaluate the efficacy of the model. Models may be re-trained periodically based upon observed performance, and individual models may be tuned to obtain the desired behavior.

As stated, each category of propensity models may be trained on different data. For cross-sell propensity models, the processed dataframe 330 may include account history-related variables and digital clickstream variables at the customer level. Feature recommendation and user intent prediction categories of propensity models may have a processed dataframe 330 which includes app feature usage, recent account and rewards balances and recent transaction behavior, in addition to account history and digital clickstream data. Call reason prediction models are trained on a processed dataframe 330 that includes transaction data, account level events, digital clickstream data, payment data and call history data.

Figure 4:
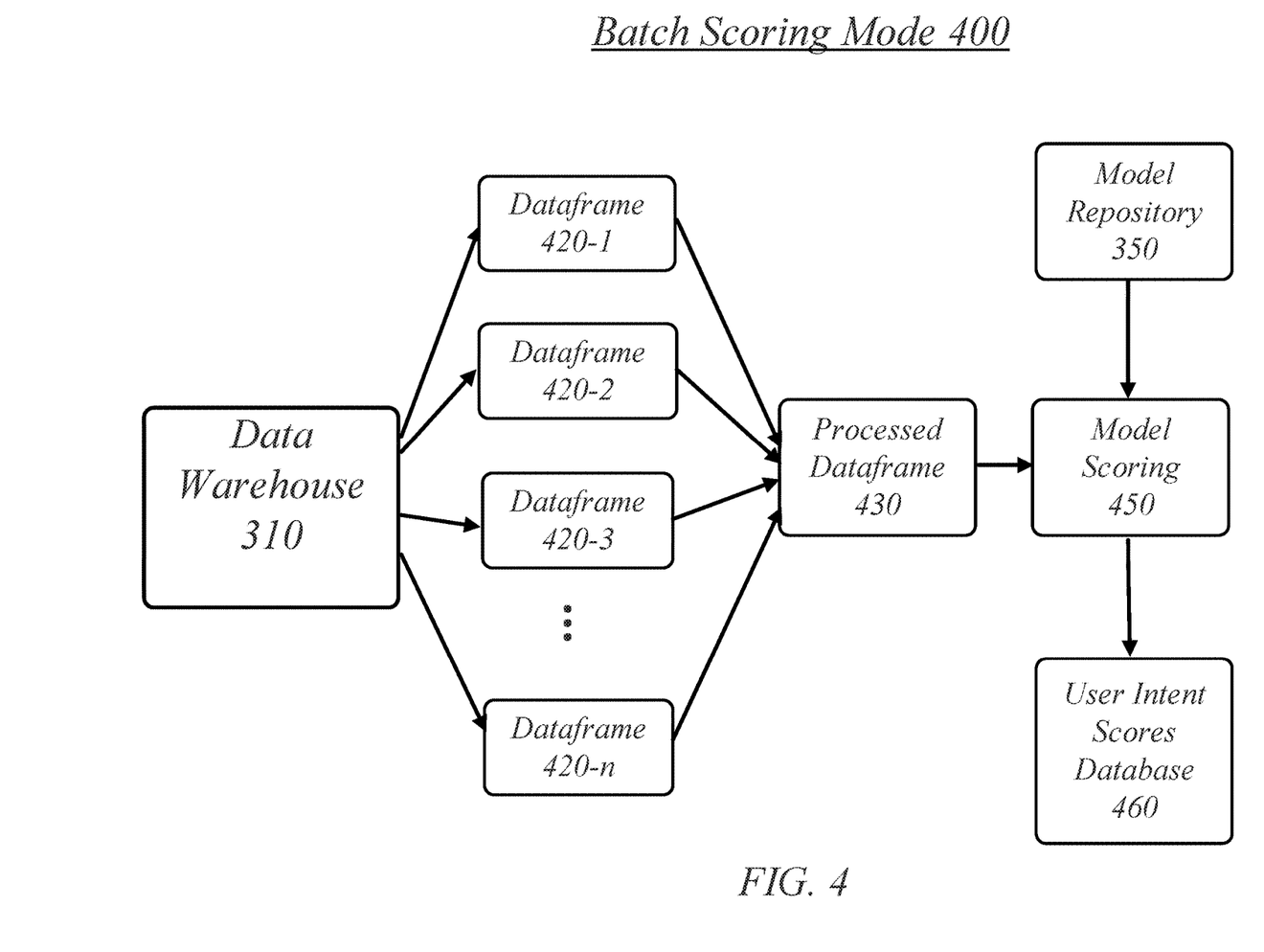
FIG. 4 illustrates an embodiment of the invention wherein scoring for all user intents for all users is accomplished in a batch mode.

FIG. 4 shows the use of the propensity models to generate user intent scores for individual users in a batch scoring mode. The batch scoring mode provides updates to the user intent scores for all or specific subset of users and places the scores in the user intent scores database 460 for easy retrieval. In batch scoring mode, data is retrieved from data frames **420-1, 420-2 . . . 420-*n* and transformed into process data frame 430. The data is retrieved from one or more data warehouses 310, and cast into the form of dataframes 420-1, 420-2 . . . 420-*n*, which are data structures conducive to large-scale processing. Because data warehouse 310 almost always stores the requisite data separately (e.g. transactions data are stored in a different location than account data), each dataset is initially put into a separate dataframe. The initial dataframes thus contain different types of data, but each dataframe will have the same type of data on every customer. A subsequent processing step combines all the separate dataframes into processed dataframe 430, before being fed to trained model 450**.

Individual propensity models are retrieved from model repository 350 and model scoring occurs at 450. In batch scoring mode, for each category, a process retrieves the trained models from model repository 350, processes current data from the warehouse, and performs scoring on the current data for each model. In some embodiments, the process of model scoring may be performed by one or more microservices in a serverless cloud-based architecture that is spun up or instantiated for each instance of batch model scoring. The output from each model is then combined with the business value factors 260 and the organic relevance factors 250 to produce the user intent scores. The scores are stored in user intent scores database 460 can be queried via API 146 by business applications. The batch scoring process may be repeated on a frequent and/or regular basis (e.g., daily, weekly, etc.) to refresh the scores.

Figure 5:
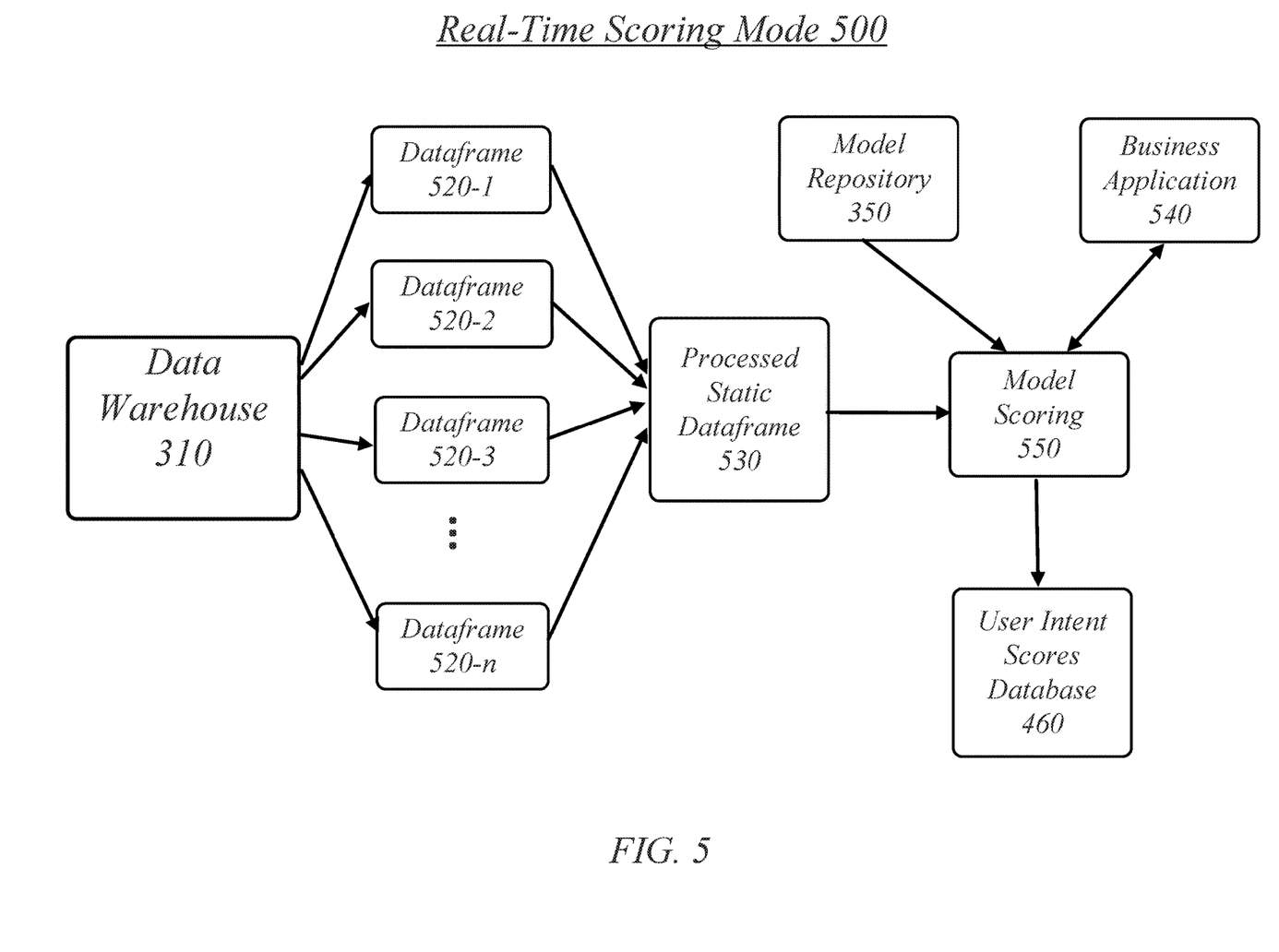
FIG. 5 illustrates an embodiment of the invention utilizing a real-time scoring mode for the calculation of user intent scores for a specific user in real time.

FIG. 5 shows the scoring of models in real-time scoring mode. In real-time scoring mode, data for individual users is composed of static features, retrieved from the warehouse as in batch scoring, from data frames 520-1, 520-2 . . . 520-*n*. The static data is processed in batch on a regular basis and placed in the processed static dataframe 530, which contains the static features for all users. Via a separate channel, real-time streaming events for a particular user may be retrieved. Real-time streaming events may be provided by business application 540 as part of the request for user intent scores for a specific user. The real-time streaming events may include, for example, clickstream data from the user's current session with the business application. Model scoring 550 retrieves individual models from model repository 350 and, utilizing process data frame 530 as well as real-time streaming events for business application 540, scores the individual models for the particular user. The scores generated by the propensity models are then combined with the business value factors 260 and the organic relevance factors 250 to produce the user intent scores for the particular user. The user intent scores for the particular user stored in user intent scores database 460 and returned to business application 540 via API 146.

Figure 6:
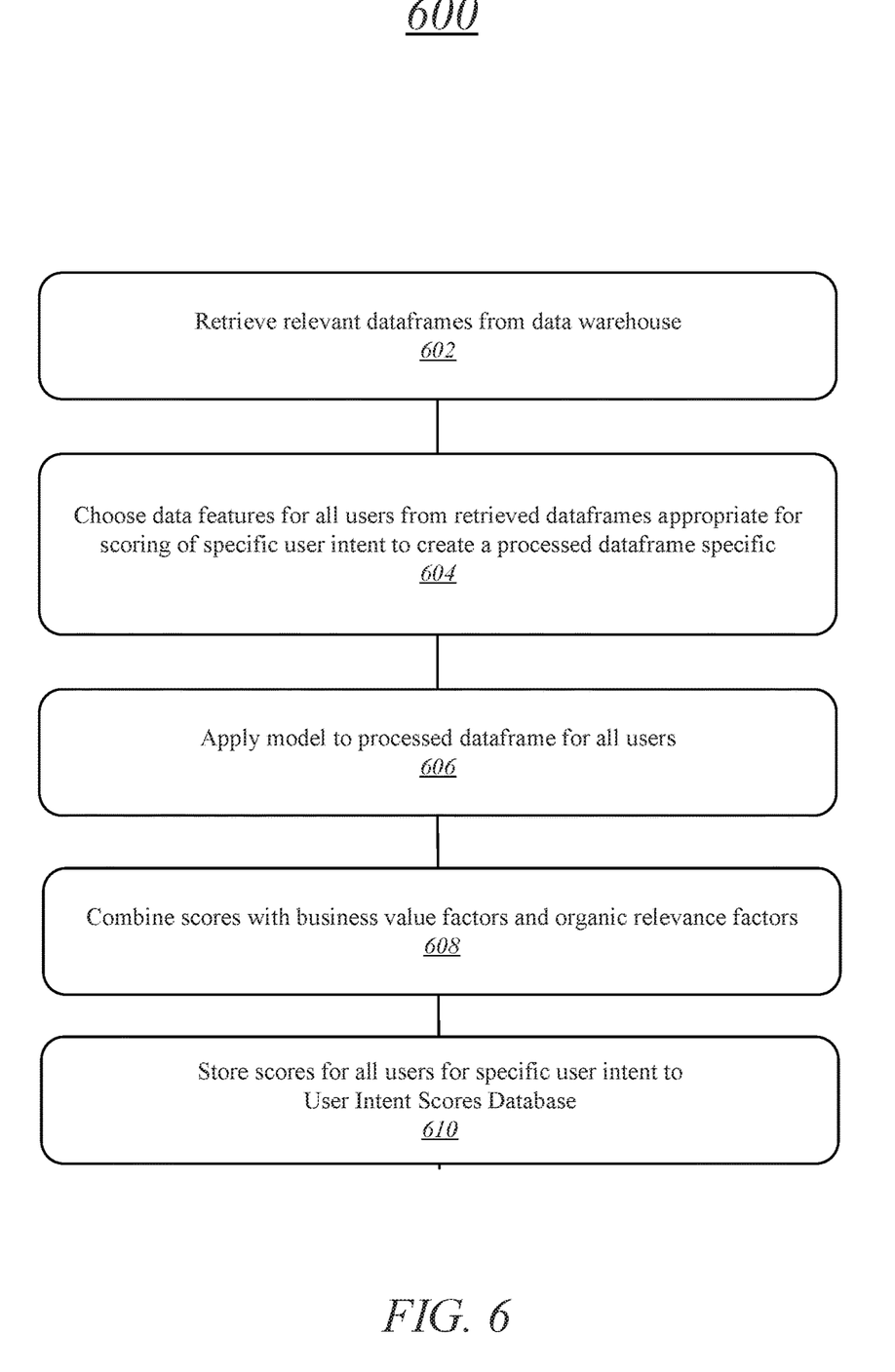
FIG. 6 is a flowchart showing a process for scoring user intents for all users in batch mode.

FIG. 6 is a flowchart showing the scoring process in batch scoring mode. At 602, relevant data frames are retrieved from the data warehouse. At 604, the data features appropriate for the scoring of a specific user intent propensity model is retrieved from the data frames for all users and stored in the processed dataframe 430. At 606, the models are applied to processed data frame 430 for all users. At 608, the scores from the propensity models are combined with business value factors and organic relevance factors to produce the user intent scores and, at 610, the user intent scores for all users are stored to the user intent scores database. In some embodiments, this process is repeated daily so as to refresh the user intent scores for all users on a daily basis.

Figure 7:
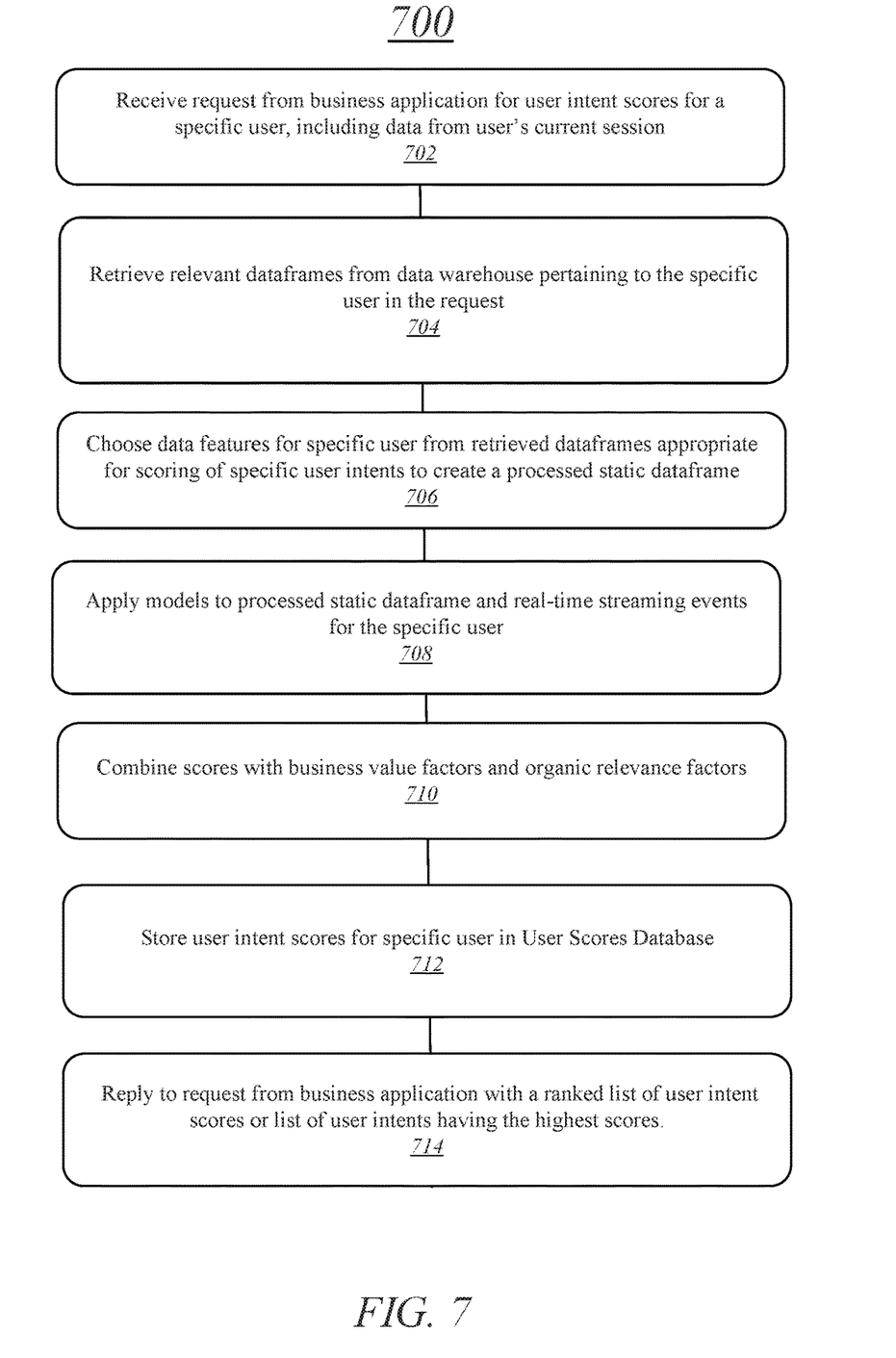
FIG. 7 is a flowchart showing a process for scoring user intents for a single user in real-time mode.

FIG. 7 is a flowchart showing the scoring process in real-time scoring mode. At 702, a request is received from a business application for user intent scores for specific user. The request may or may not include data from the user's current session with business application. At 704, relevant data frames are retrieved the data warehouse pertaining to the specific user in the request and at 706 data frames for the specific user is processed to create a processed static data frame 530. At 708, the models are scored using the data in the processed static dataframe 530 and the real-time streaming events for the specific user, from the user's current session with the business application. At 710, the propensity scores from the individual models are combined with the business value factors 260 and the organic relevance factors 250 to obtain the user intent scores for the particular user. At 712 user intent scores are stored in the user intent scores database 460 and, at 714, the business application making the request is replied to with a ranked list of user intent scores or list of user intent scores having the highest scores. As previously stated, features and content may also be returned to the business application for use in the user interface of the business application.

A system to implement the invention, in one embodiment, may comprise a memory to store instructions and processing circuitry coupled with the memory to execute the instructions which will enable the processing circuitry to receive a request from a business application for a user intent score for one or more user intense regarding the user interacting with other business applications; retrieve a business value for each of the one of more the user intents; retrieve a probability, determined by a trained machine learning model, that the user will engage in a specific activity related to the one or more user intents while interacting with the business application; calculate the user intent scores for the one or more user intents, the user intent scores comprising a combination of the business value for each of the user intents and the probability that the user will engage in the specific activity; and send the user intent scores to the client business application.

The system may further comprise a client business application running on a user client device, a web server serving a website or user interacting with an automated menu or a human operator at a call center.

The system may further comprise, when the client business application is an application running on the client device or web server serving a website and when the user intents include a cross-cell propensity of the user acquiring a specific product, the machine learning model being trained using account history-related variables of the user's account and digital clickstream data regarding the interaction of the user with the business application as input.

The system may further comprise, when the client business application is an application running on a user client device or web server serving a website and when the user intents include a feature recommendation indicating a feature of the business application that the user is most likely to use next and a user intent prediction of a task that the customer is likely to initiate, the machine learning model being trained account history-related variables of the user's account and digital clickstream data, as well as application feature usage behavior and recent transaction behavior.

The system may further comprise, when the client business application is a user interacting with an automated menu or human operator at a call center, and when the user intents include a call recent prediction of what information or services user request from the call center, machine learning model being trained using transaction data, account-level events, digital clickstream data, payment data and call history data.

The system may further comprise the user intent scores being generated in a batch mode and being calculated based upon user data retrieved from a user data database for all or subset of users, and the user intent scores being stored in a user intent scores database.

The system may further comprise generating the user intent scores in real time and where the user intent scores are based upon static user data retrieved from the user data database and a further based on user actions while interacting with the business application.

The system may further comprise the business value for the specific activity indicating a relative benefit of the user engaging in the specific activity versus other activities.

The system may further comprise the machine learning models being periodically retrained based upon an evaluation of the quality of the estimates generated by the models.

A system to implement the invention, in another embodiment, may comprise a memory to store instructions and processing circuitry coupled with the memory to execute the instructions which will enable the processing circuitry to present, on a display, a business application to a user; request, from a server, user intent scores for one or more user intents regarding the user interacting with the business application; receive, from the server, the user intent scores regarding the user; and modify the behavior of the business application based upon the user intent scores; the user intent scores being a combination of a business value and a probability, the probability determined by a trained machine learning model, that the user will engage in a specific activity while interacting with the business application.

The system may further comprise a business application being an application executing on a user client device, or, the business application being a webpage being served by a webpage server and being accessed by the user over the Internet, or, the business application comprising the user interacting with an automated menu or human operator at a call center.

The system may further comprise the user intent scores including across the-cell propensity of the user to acquire specific product and modifying the behavior of the business application to present to the user an inducement to acquire the specific product.

The system may further comprise the user intent scores including a feature recommendation indicating a feature of the business application that the user is most likely to use next and modifying the behavior of the business application to include presenting, to the user, and inducement to access the feature.

The system may further comprise the user intent scores including a user intent prediction of a task that the user is likely to initiate and modifying the behavior the business application to present to the user and inducement to initiate the task.

The system may further comprise the user intent scores including a call recent prediction of information or services the user will request from a call center and further having an automated menu or human operator inducing the user to request the services.

The system may further comprise the request for user intent scores which includes information regarding the interaction of the user with the business application during the current session between the user and the business application.

An embodiment comprising a non-transitory computer readable storage medium may contain instructions that when executed by a processor will cause the processor to receive a request from a client-side application for a user intent score for one or more user intents, the request including information regarding user interactions with the client-side application; determine a business value associated with each of the one or more user intents; utilize a trained machine learning model to determine a probability that a specific activity will occur relating to the one or more user intents based at least in part on the information regarding user interactions with the client-side application; calculate user intent scores for the one or more user intents, the user intent scores comprising a combination of the business value for each of the user intents and the probability the specific activity will occur; and cause, via one or more networking links, communication of the user intent scores to the client-side application.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in vari-ous places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more ele-ments are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or opti-cal signals capable of being stored, transferred, combined, compared, and otherwise manipulated. It proves convenient at times, principally for reasons of common usage, to refer to these signals as bits, values, elements, symbols, characters, tem1$s$, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise one or more general-purpose computers as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to per-form the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition. In the foregoing Detailed Description, it can be seen that various features are grouped together in a single embodiment for the purpose of streamlining the disclosure. This method of disclosure is not to be interpreted as reflecting an intention that the claimed embodi-ments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

We claim:

1. A system, comprising:
    a memory to store instructions; and
    a processing circuitry, coupled with the memory, operable to execute the instructions that when executed enable the processing circuitry to:
    present, on a display, a business application to a user;
    receive, by the business application, user interactions;
    request, from a server, user intent scores for one or more user intents regarding the user interactions while the user is interacting with the business application;
    receive, from the server, the user intent scores regarding the user interactions, each of the user intent scores provide a combination of a business value factor and a probability that the user will engage in a corresponding specific activity while interacting with the business application; and
    customize or modify, by the business application, information to present on the display based upon the user intent scores including the received business value factor and the probability; and
    present, on the display, by the business application, customized or modified information to the user
    wherein the probability is determined by a trained machine learning model that the user will engage in the corresponding specific activity while interacting with the business application.

2. The system of claim 1 wherein the business application is an application executing on a user client device.

3. The system of claim 1 wherein the business application is configured to perform the user interactions with an automated menu.

4. The system of claim 3 wherein the user intent scores include a call reason prediction of what information or services the user will request from the call center and further wherein the automated menu induces the user to request the services.

5. The system of claim 1 wherein the user intent scores include a cross-sell propensity of the user to acquire a specific product and further wherein the information comprises an inducement to acquire the specific product.

6. The system of claim 1 wherein the user intent scores include a feature recommendation indicating a feature of the business application that the user is most likely to use next and further wherein the information comprises an inducement to access the feature.

7. The system of claim 1 wherein the user intent scores include a user intent prediction of a task that the user is likely to initiate and further the information comprises an inducement to initiate the task.

8. The system of claim 1 wherein the request for user intent scores includes information regarding the interaction of the user with the business application occurring during a current session between the user and the business application.

9. A computer-implemented method, comprising:
    presenting, on a display of a client device, a business application to a user;
    detecting, by the business application, user interactions;
    requesting, by the client device and from a server, user intent scores for one or more user intents regarding the user interactions with the business application;
    receiving, by the client device and from the server, the user intent scores regarding the user interactions, each of the user intent scores provide a combination of a business value factor and a probability that the user will engage in a corresponding specific activity while interacting with the business application;
    customizing or modifying information to present on the display by the business application based upon the user intent scores including the received business value factor and the probability; and
    presenting, on the display, by the business application, customized or modified information to the user
    wherein the probability is determined by a trained machine learning model that the user will engage in the corresponding specific activity while interacting with the business application.

10. The computer-implemented method of claim 9 wherein the user interactions are with an automated menu provided via the business application.

11. The computer-implemented method of claim 10 wherein the user intent scores include a call reason prediction of what information or services the user will request from the call center and further wherein the automated menu induces the user to request the services.

12. The computer-implemented method of claim 9 wherein the user intent scores include a cross-sell propensity of the user to acquire a specific product and the information comprises an inducement to acquire the specific product.

13. The computer-implemented method of claim 9 wherein the user intent scores include a feature recommendation indicating a feature of the business application that the user is most likely to use next and the information comprises an inducement to access the feature.

14. The computer-implemented method of claim 9 wherein the user intent scores include a user intent prediction of a task that the user is likely to initiate and the information comprises an inducement to initiate the task.

15. The computer-implemented method of claim 9 wherein the request for user intent scores includes information regarding the interaction of the user with the business application occurring during a current session between the user and the business application.

16. A non-transitory, computer-readable storage medium containing instructions that, when executed by a processor, cause the processor to:
    present, on a display, a business application to a user;
    receive, by the business application, user interactions;
    request, from a server, user intent scores for one or more user intents regarding the user interactions while the user is interacting with the business application;

receive, from the server, the user intent scores regarding the user interactions scores, each of the user intent scores provide a combination of a business value factor and a probability that the user will engage in a corresponding specific activity while interacting with the business application; and customize or modify, by the business application, information to present on the display based upon the user intent including the business value factors and the probabilities; and present, on the display, the information in the business application, and present, on the display, by the business application, customized or modified information to the user wherein the probability is determined by a trained machine learning model that the user will engage in the corresponding specific activity while interacting with the business application.

* * * * *